United States Patent

Peterson

[15] 3,654,811

[45] Apr. 11, 1972

[54] FOLDABLE LOAD BEARING MECHANISM AND ACTUATING DEVICE

[72] Inventor: Carlton G. Peterson, Altadena, Calif.
[73] Assignee: Lockheed Aircraft Corporation, Burbank, Calif.
[22] Filed: Jan. 2, 1970
[21] Appl. No.: 324

[52] U.S. Cl..................................74/101, 74/607, 16/128, 74/520
[51] Int. Cl...........................................F16h 21/44
[58] Field of Search.................74/101, 607, 520; 16/49, 128

[56] References Cited

UNITED STATES PATENTS

| | | | |
|---|---|---|---|
| 2,943,498 | 7/1960 | Smith | 74/520 |
| 3,153,258 | 10/1964 | Badura | 16/128.1 |
| 2,972,259 | 2/1961 | Favre | 74/520 |

Primary Examiner—Meyer Perlin
Assistant Examiner—Wesley S. Ratliff, Jr.
Attorney—Frank L. Zugelter and George C. Sullivan

[57] ABSTRACT

1. A structural load bearing mechanism for transmitting loads, moments and couples from an aircraft nose to its fuselage, rigidity between nose and fuselage being likewise transmitted through such mechanism;

2. means for locking such mechanism in either of two positions; and 3. an actuating mechanism for positioning nose relative to fuselage upon adapting 1 and 2 above to a supersonic aircraft, for supersonic and subsonic flight conditions.

Such adaptation provides a streamlined configuration of nose to fuselage for supersonic flight conditions, while for either supersonic or subsonic flight, maximized visual observation from a pilot's station in the aircraft is achieved.

11 Claims, 13 Drawing Figures

United States Patent
Peterson

INVENTOR.
CARLTON G. PETERSON
BY George A. Sullivan
Agent

INVENTOR.
CARLTON G. PETERSON
BY
George Sullivan
Agent

Fig. 4

INVENTOR.
CARLTON G. PETERSON

Fig. 5

INVENTOR.
CARLTON G. PETERSON
BY
Agent

FOLDABLE LOAD BEARING MECHANISM AND ACTUATING DEVICE

BACKGROUND OF THE INVENTION

1. Field of the Invention

The field of art to which the invention is most likely to pertain is located in a class of devices generally relating to mechanisms. Class 74, Machine Elements and Mechanisms, U.S. Patent Office Classification, may be the applicable general area of art in which the claimed subject matter of the type involved here may be classified.

2. Description of the Prior Art

It is not presently known what prior art devices exist in art to which this invention most likely pertains.

EXISTING PROBLEMS AND SOLUTIONS

In the operation of an aircraft at a supersonic speed, it is desirable to employ an exterior contour for the aircraft which is of streamline shape and which is extremely smooth. Any break in the continuity and smoothness of the exterior contour, particularly in the vicinity of the aircraft's nose, results in a tendency to create turbulence, drag, excessive heating and other difficulties.

Aircraft design has employed streamline configurations for nose and fuselage in the past which have provided a smooth and continuous contour in the form of a streamline shape. However, the nose has been generally of conical configuration and is situated with respect to the pilot's cockpit or station so as to adversely affect the pilot's vision in a downward-and-forward direction. For example, the opposing considerations of drag encountered in the design of supersonic transport type aircraft, which dictates a long (high fineness ratio) thin nose, and cockpit design, which requires at least a 125 inch fuselage diameter in order to place a side-by-side crew at a reasonable point in the nose, combine on large supersonic transport aircraft to place the nose structure 25 feet forward of the pilot's eye, thus constituting an obstruction. This obstruction to pilot visibility raises problems associated with adequate approach and landing visibilities such as the amount of ground surface available, ground lighting system influence, and crosswind consideration, as well as reference cues for vertical and horizontal guidance assisting aircraft alignment and roll attitude control in all regimes of flight. A pilot's forward vision is considered necessary in all aircraft flight regimes so that he may have ample direct vision in and for all critical angles of azimuth and elevation. Downward vision is of utmost importance, particularly in aircraft having a high angle of attack, for landing and takeoff purposes in the presence of a crosswind, and for aircraft approach and ascent maneuvering.

A conventional approach to the problem of affording a pilot with a degree of forward vision in supersonic aircraft involves employment of a nose pivotable about its fuselage at a pivot point below and forward of the pilot station. However, aircraft instability conditions with respect to the nose and fuselage have been encountered as a result. Furthermore, systems for positioning the nose relative to the fuselage have required heavy actuating equipment and accompanying supporting structures for preventing racking or twisting of the positionable nose.

SUMMARY OF THE INVENTION

The invention generally relates to supersonic aircraft nose and fuselage positions at various flight speeds, and in particular is directed to a device utilized and adaptable for transferring loads, moments and couples from the nose to fuselage during all flight regimes while maintaining rigidity for the nose in various positions in such regimes. Such device is hereinafter generally referred to as a structural load bearing mechanism and hydraulic actuating means for positioning a nose about its fuselage, providing aircraft nose rigidity for all degrees of freedom in the nose up-and-down positions as well as its intermediate positions therebetween.

An object of this invention is to provide during flight avoidance of problems associated with torsional racking and twisting of the nose with respect to its fuselage as it is variously positioned for supersonic and subsonic speeds of the aircraft.

Another object of the invention is to provide continuity of rigidity between a nose and its fuselage during relative positioning of nose-to-fuselage in addition to the locked position between the nose and fuselage for supersonic and subsonic flight conditions.

A further object of the invention is to provide transmission during flight of substantial loads, such as side loads, yaw and roll moments, and couple moments, from the nose to the fuselage for any position; up, down or intermediate of the nose relative to the fuselage.

Another object of the invention is to provide during flight locking of the nose in its nose-up and nose-down positions in such a manner that generated loads encountered in all regimes of flight are transferred from the nose to the fuselage or transferred to and absorbed by a structural load bearing mechanism connecting the nose to the fuselage.

Another object of the invention is to provide transmission of bending and torsional loads from the nose to its fuselage through a continuous short path of travel in novel structural mechanism provided for the nose and fuselage for all positions of nose to fuselage.

These and other objects and advantages will become more apparent upon a full reading of the following description, appended claims thereto, and the drawing comprising 10 sheets accompanying this written specification.

DESCRIPTION OF THE PREFERRED EMBODIMENT

Figure 1:
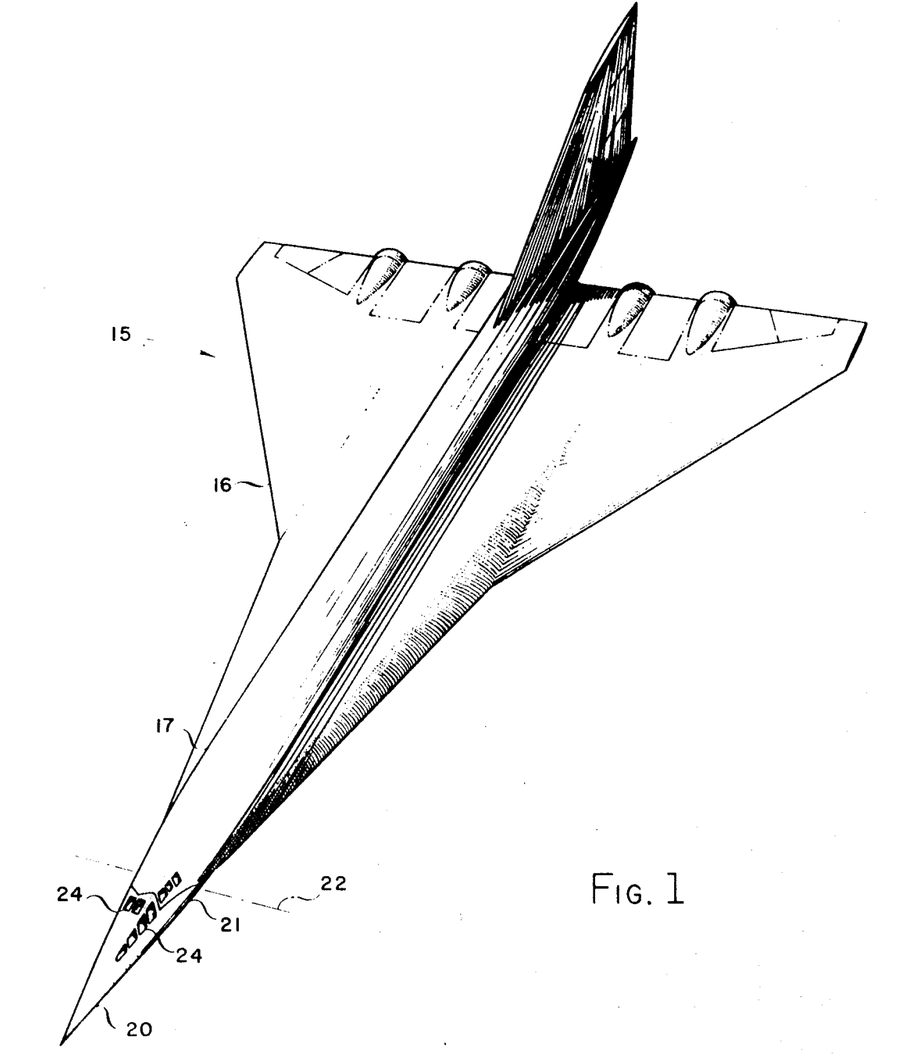
FIG. 1 is a perspective view of a supersonic aircraft of the transport type incorporating the novel subject matter of this invention.

Referring now to the drawings in which reference characters correspond to like numerals in the following description, reference character 15 (FIG. 1) generally refers to a supersonic aircraft which includes an airfoil 16 commonly referred to by those skilled in the art as a double delta wing. Aircraft 15 is provided with an elongated fuselage 17 separating such wings. A pilot's visibility platform is located at the forward end of fuselage 17. The visibility platform includes a pilot station 18 (shown in phantom in FIG. 4) located intermediate fuselage side windows 19 for suitably accommodating a pilot and co-pilot in a side-by-side seating arrangement. A movable, substantially conical nose 20 is pivotally supported at axis 22 from fuselage 17 and which when positioned for supersonic flight, blends with the overall streamline contour of fuselage 17 to provide low aerodynamic drag. Movable nose 20 includes a rearwardly extending jaw portion 21 at each of its sides. Jaw portion 21 is pivotally connected about transverse horizontal axis 22, and extends to the forward end of fuselage 17. Such pivotal connection is disposed rearwardly of pilot station 18 in such a manner that the forward tip of nose 20 is capable of swinging downwardly or upwardly, from the high speed flight position of FIG. 2 to the low speed flight position of FIG. 3, respectively.

A dual windshield system for pilot visibility is employed, and includes a windshield array 23 (FIGS. 1, 2 and 3) in fuselage 17 and a windshield array 24 disposed on movable nose 20. Array 23 may be referred to as an under-supersonic or subsonic windshield incorporated into an abrupt forward wall 25 terminating the forward end of fuselage 17 immediately ahead of pilot station 18. Forward windshield array 23 is arranged directly in front of the pilot's normal forward field of vision for viewing the flight path afforded primarily during low speed flight.

The array of windows 24 is employed to effectively eliminate portions of the nose's structure which would otherwise completely obstruct the pilot's vision forward when nose 20 is in its high speed position. This array of windows 24 may be referred to as a supersonic windshield and includes a pair of top windows 24t which are separated by the aircraft's top longitudinal center line, and a plurality of lateral or side windows 24s arranged in a row on each side of movable nose 20.

Figure 2:
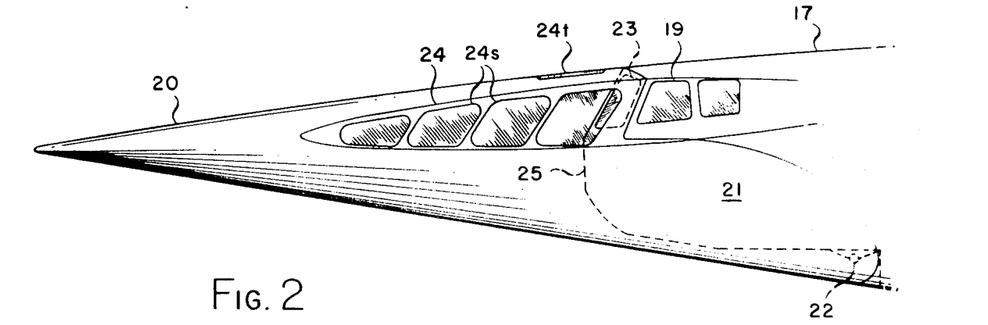
FIG. 2 is a side elevational view of a forward portion of a fuselage and movable nose therewith positioned for high speed or supersonic flight conditions.

In the nose-up or supersonic flight nose position of FIG. 2, the pilot's line-of-sight forward is through the array of forward windows 24; i.e., through the supersonic lateral and top windows 24s, 24t. At all times during supersonic flight pilot forward visibility is through these arrays of windows. Nose windows 24 are so registered with relation to the line of sight of the pilot at pilot station 18 as to afford adequate vision to the pilot during high speed flight conditions. Such adequate vision includes the pilot's ability to determine and recognize a horizon line in the approaching visional distance as well as to note the presence of other aircraft by such means as contrails or other objects along the flight path of such aircraft. Top windows 24t located about the longitudinal center line of nose 20 are also in visionary registry with the windshield located in forward wall 25 of fuselage 17, thereby further reducing forward obstruction to the pilot's vision by nose 20 during supersonic flight of aircraft 15.

Figure 3:
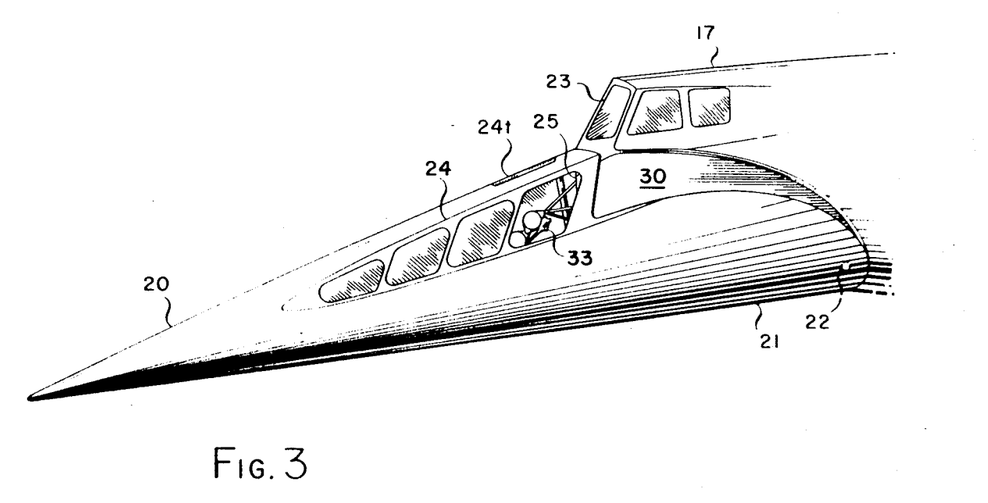
FIG. 3 is a side elevational view of the movable nose positioned on its fuselage for low speed or subsonic (under-supersonic) flight conditions.
Figure 4:
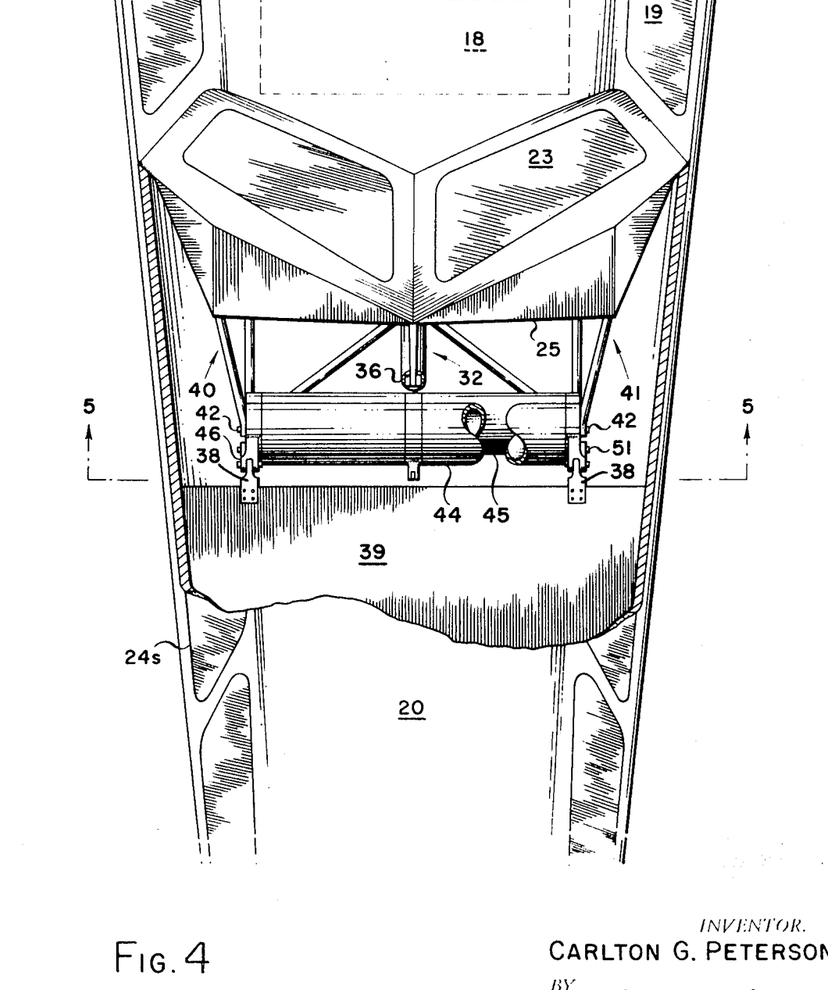
FIG. 4 is a top plan view, partially broken away, of the forward portion of the fuselage and the movable nose connected thereto, exposing a foldable structural load bearing mechanism forming a part of the present invention.
Figure 5:
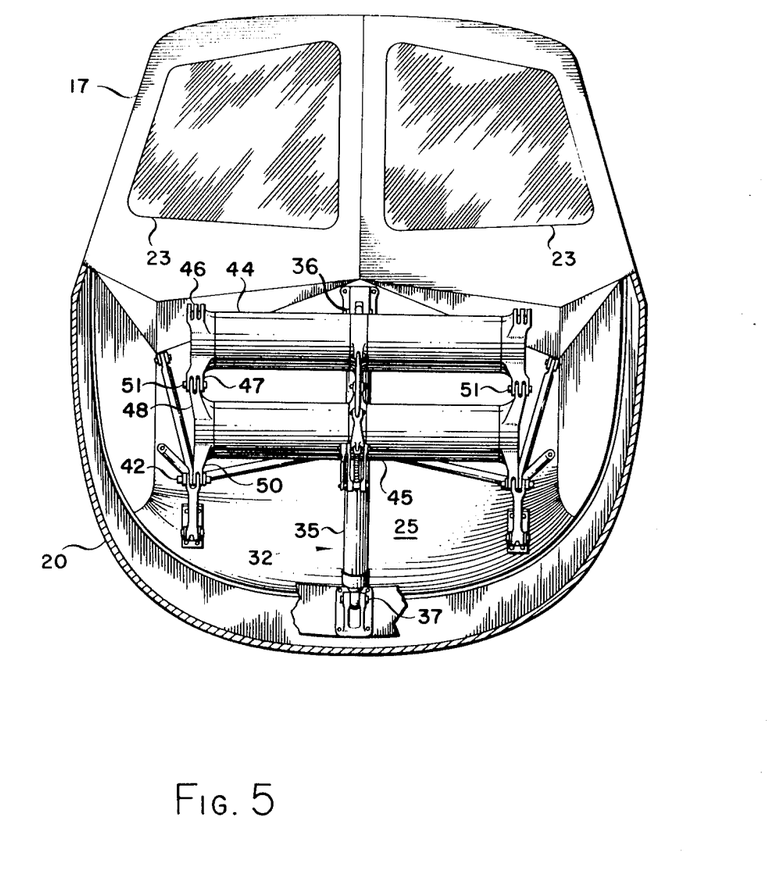
FIG. 5 is a transverse elevational sectional view taken on line 5—5 of FIG. 4.

In FIG. 3, the side walls of fuselage 17 in its forward portion are shown somewhat relieved or cut away as is indicated by the numeral 30 in order to accommodate movement and mating of rearwardly extending jaw 21 with fuselage 17, in order to provide a continuous streamline contour for supersonic flight. It is to be noted that the downward positioning of nose 20 uncovers and exposes to atmosphere subsonic forward windshield array 23 immediately ahead of pilot station 18, in order to provide unobstructed pilot vision, not only forwardly of aircraft 15 in the direction of its flight path, but also downwardly, particularly whenever the angle in incidence of aircraft 15 is relatively steep, such as for takeoff and landing procedures.

Nose 20 with rearwardly extending jaw portion 21 complements the contours of fuselage 17 to constitute an exteriorly smooth, substantially unbroken streamline shape without covering or eclipsing the pilot's side windows 19. Any interruption at the abutting juncture of each jaw portion 21 with fuselage 17 is so slight as to be negligible. Even so, such interruption can be minimized by proper relative shaping of the mating parts and by flexible fairings if desirable. By forming fuselage forward wall 25 and relieved surfaces 30 in fuselage 17 with care, so that complementary forming of nose 20 and extending jaw portion 21 with fuselage 17 is achieved, no gap is lift in any relative position of the nose and fuselage. Nose pivot axis 22 should be well to the rear and below pilot station 18 so that slight angular departure of nose 20 from its high speed flight position will immediately uncover and expose windshield 23 directly ahead of the pilot, with proper support and rigidity for nose 20 being achieved and as will be described hereinafter. The precise location of pivot axis 22 together with the radial trim of the nose structure portion around the pivot, provides for downward swing of that portion of nose 20 into fuselage 17 (towards relieved surfaces 30) without interference or discontinuity. In addition, such pivot location provides a downwardly forward slope for subsonic windshield 23, at approximately 32°, to decrease aerodynamic drag at subsonic speeds when nose 20 is lowered.

Figure 6:
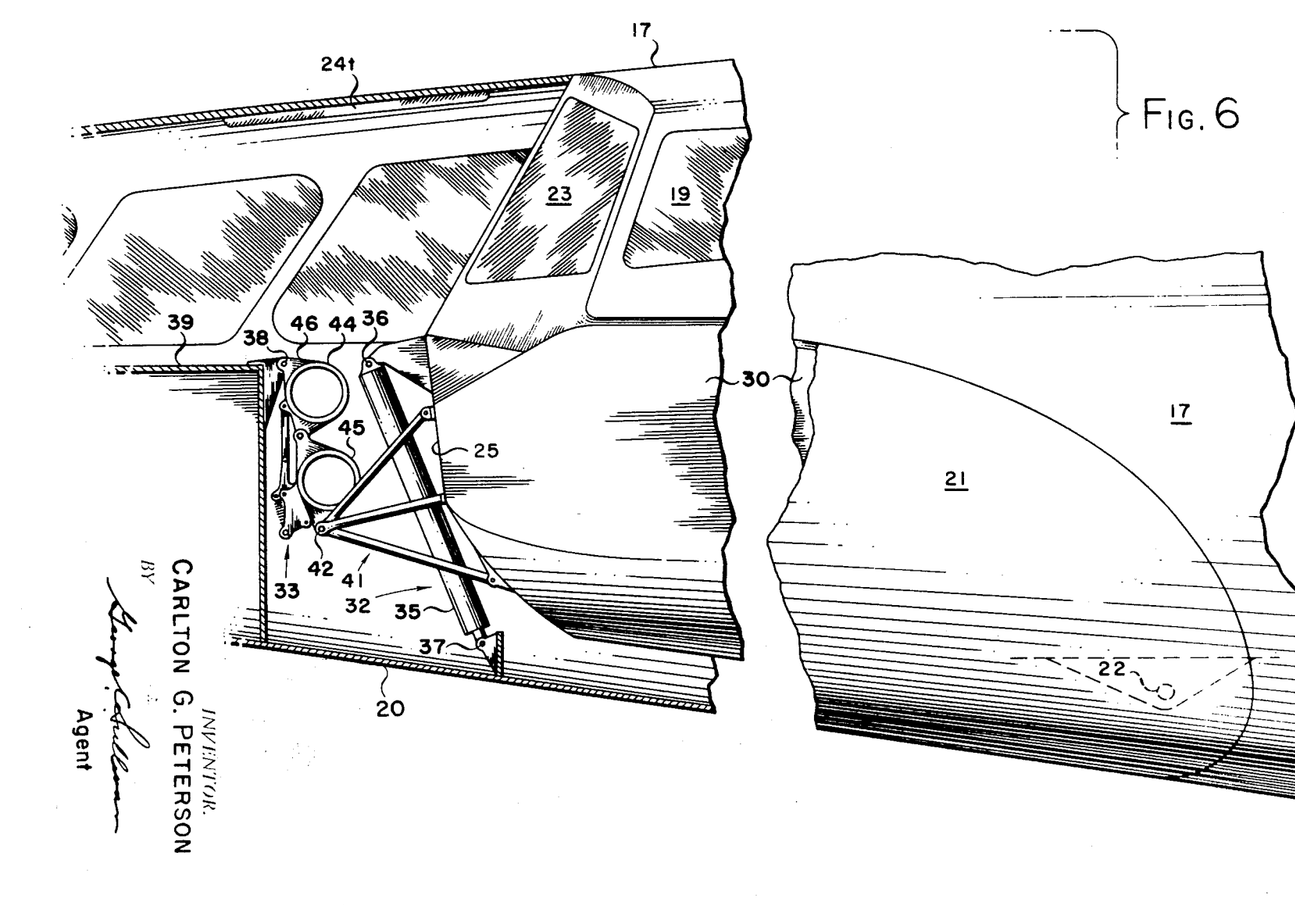
FIG. 6 is an enlarged elevational view, partially in section, of the forward portion of the fuselage and the movable nose hingeably connected thereto.
Figure 7:
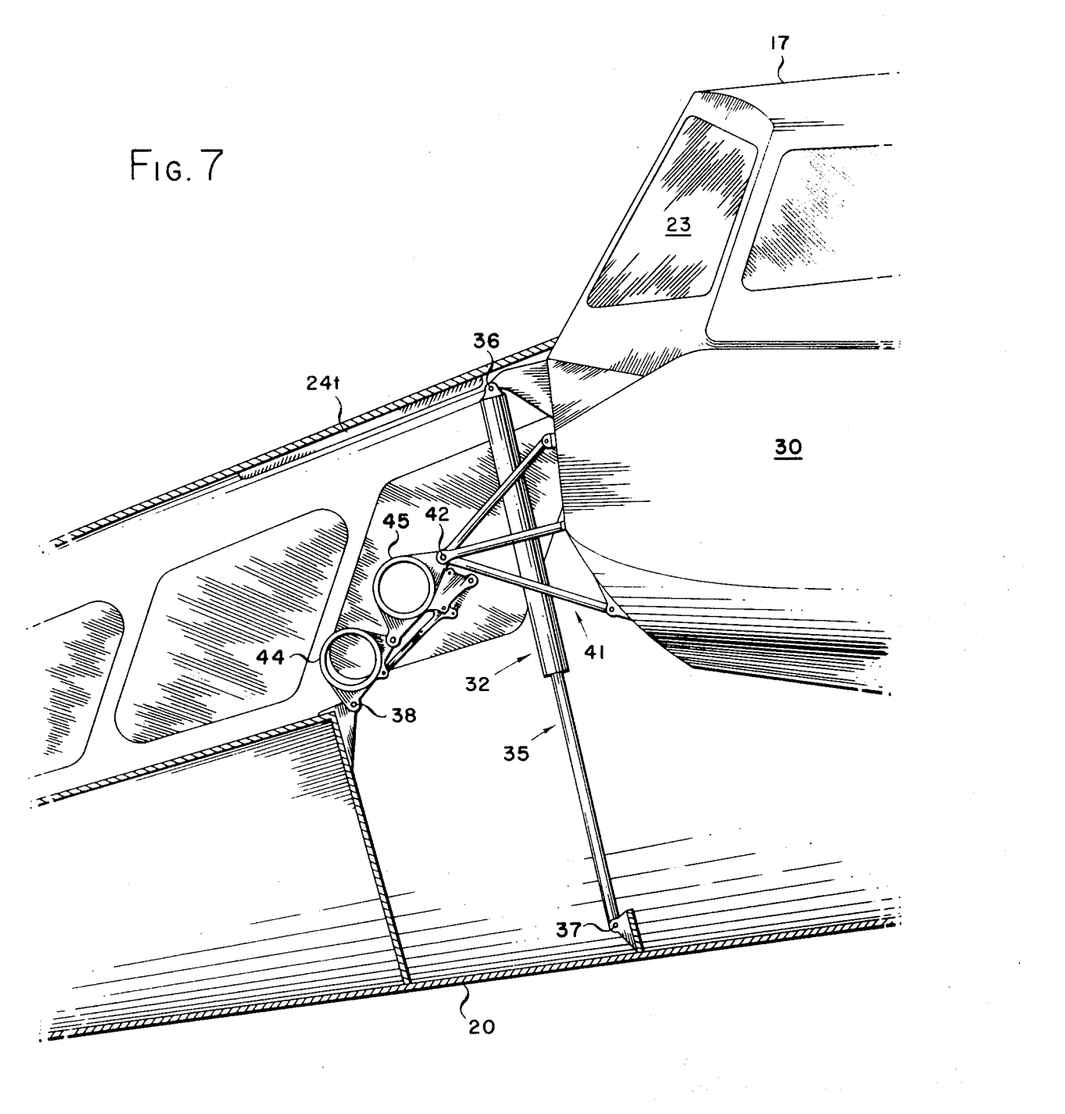
FIG. 7 is a view similar to that of FIG. 6, showing the foldable mechanism in a position corresponding to position of the nose for subsonic flight conditions.

Referring now to FIGS. 4–7, an actuating means and a load bearing mechanism are generally indicated at 32 and 33, respectively. These devices effect movement of nose 20 between high speed and low speed flight positions, and also provide for the absorption and transference of twisting and bending loads from nose 20 to fuselage 17. Furthermore, mechanism 33 maintains and rigidly supports nose 20 to forward wall 25 throughout the entire range of operation for such nose. FIG. 6 illustrates actuating means 32 and mechanism 33 when nose 20 is in its supersonic flight position. FIG. 7 illustrates such devices when nose 20 is in its full down position for subsonic flight. Actuating means 32 and mechanism 33 are mounted in such a manner that direct line-of-sight through the dual windshield system will not be obstructed or obscured in either position of nose 20. As clearly shown in these figures, this object is accomplished by actuating means 32 being in fully extended mode when nose 20 is in its full down position, and in retracted mode when nose 20 is in its full up position, while mechanism 33 includes folding means operable between movement from its one position when nose 20 is in its full down position to its position when nose 20 is in its full up position.

Actuating means 32 comprises a piston and cylinder assemblage 35 having its cylinder end pivotally connected to fuselage forward wall 25 at connection 36 and its piston rod coupled to a pivot 37 suitably attached to the bottom or lower portion of nose 20. Extension under hydraulic pressure supplied to the cylinder and piston rod in well known or conventional manner causes nose 20 to swing downwardly on its hinge axis 22 as the piston rod extends or advances, while pivot connections 36 and 37 function to maintain clearance between assemblage 35 and forward wall 25. Nose 20 may be held in an intermediate position by hydraulically locking piston and cylinder assemblage 35 anywhere along its operable length. It may be noted that power to actuating means 32 is not applied through mechanism 33. In all intermediate nose positions, mechanism 33 only follows nose 20 as a slaved unit and provides rigidity between nose and fuselage with regard to roll and yaw moments and side loads applied thereto.

To maintain rigidity throughout the entire range of aircraft operation and to particularly avoid problems of twisting and racking between nose and fuselage when nose 20 is either being positioned or in its subsonic position, load bearing mechanism 33 is employed. One end of mechanism 33 is pivotally connected on its opposite sides to a pair of spaced apart bracket members 38 (FIGS. 4, 6, 7) secured to a deck 39 suitably secured to nose 20. Deck 39 is mounted transversely across nose 20 and extends generally in alignment with the central horizontal geometrical plane of fuselage 17. The other end of mechanism 33 is pivotally coupled on its opposite sides to respective verteces 42 of a pair of left-and-right triangulated truss members 40 and 41 rigidly fixed and extending forwardly from forward wall 25. Thus, each truss member 40, 41 may be considered a rigid part of fuselage 17. The design characteristics of load bearing mechanism 33 provides two nose hard points through which high rigidity load forces generated by side loads and yaw and roll moments are transferred to it from nose 20. These nose hard points are located at bracket members 38. These forces and moments are transmitted to corresponding hard points at verteces 42 on fuselage truss members 40 and 41 throughout all rotation positions for nose 20. Pitching moments of nose 20 in its full-up and full-down positions are taken out as vertical loads on points along axes A, B and on points along axes B, C (FIGS. 9, 10, 13), such axes hereinafter more fully described. Zero loads occur on points on axes A, on axes B and B, C in intermediate positions of nose 20 while vertical loads are taken out in hydraulic actuator 32. As to yaw and roll moments, the bending and torsion a pair of in tubes 44, 45 in mechanism 33 provide for stability of the aircraft in any of the three positions, nose full-up, nose full-down, and intermediate.

The unique load bearing mechanism 33 comprises the pair of interconnected torque tubes 44 and 45. Each of the opposite ends of torque tube 44 includes radially extending brackets 46 and 47 (FIG. 8), and each of the opposite ends of torque tube 45 includes radially extending brackets 48 and 50. Brackets 46 are pivotally attached to members 38 and brackets 50 are pivotally connected at verteces 42 of fuselage truss members 40, 41. Brackets 47 and 48 at their associated ends of tubes 44, 45 are pivotally interconnected between themselves as at pivots 51 shown in FIGS. 5 and 8. Interconnected torque tubes 44, 45 provide a continuous load path between nose 20 and fuselage 17 for structural loads and other forces and the like encountered during nose positioning. Without such a continuous load path, nose 20 would have a tendency to wobble and twist and thereby produce unstable flight for aircraft 15. In an extreme condition, such undesirable effects would weaken the nose hinge at axis 22, causing severe structural damage and possible causing nose 20 to break away from such hinge connection.

In order to attain high rigidity for a minimum weight desired for mechanism 33, interconnected torque tubes 44, 45 also provide for a short load path during the folding cycle or travel of mechanism 33. It will be seen from a kinematics study of the involved structure, hereinafter described, that such short load path is almost twice the length of such interconnection. In the movement of mechanism 33 as nose 20 pivots about axis 22 in jaw portion 21, axis A (FIGS. 9, 10), lying between the respective junctures of bracket members 38 and brackets 46 for tube 44, swings in a radius about the nose hinge at axis 22. This swinging movement provides for a "knee action" travel for mechanism 33. A rigid and continuous load path is maintained throughout the assemblage and changing disposition of torque tubes 44, 45 which are folding during this travel in either direction of swing for axis A (nose 20). Tubes 44, 45 also take bending and torsional loads between and at the identical sets of the parallel hard points on each side of the aircraft's vertical center line.

Mechanism 33 is maintained in its nose full-up and full-down positions, without hydraulic power, through employment of an over-center toggle linkage means indicated generally by 52 as shown in FIGS. 8–12. Linkage 52 is mounted on tubes 44, 45 intermediate their ends. A pair of pivotally interconnected bracket members 53, 54 are integrally formed on tubes 44, 45, respectively, intermediate their lengths. Bracket members 53, 54 are connected together at a pivot connection 55 lying in an axis B (FIGS. 9, 10) extending parallel to axis A and passing through the respective pivots 51. A third axis is generated between the respective junctures of bracket members 50 on tube 45 and verteces 42 of truss members 40, 41. Axes A, B and C are parallel to each other, however, they change their relative distances among one another as tubes 44, 45 fold after release of the over-center toggle linkage means 52, immediately described hereinafter.

Figure 8:
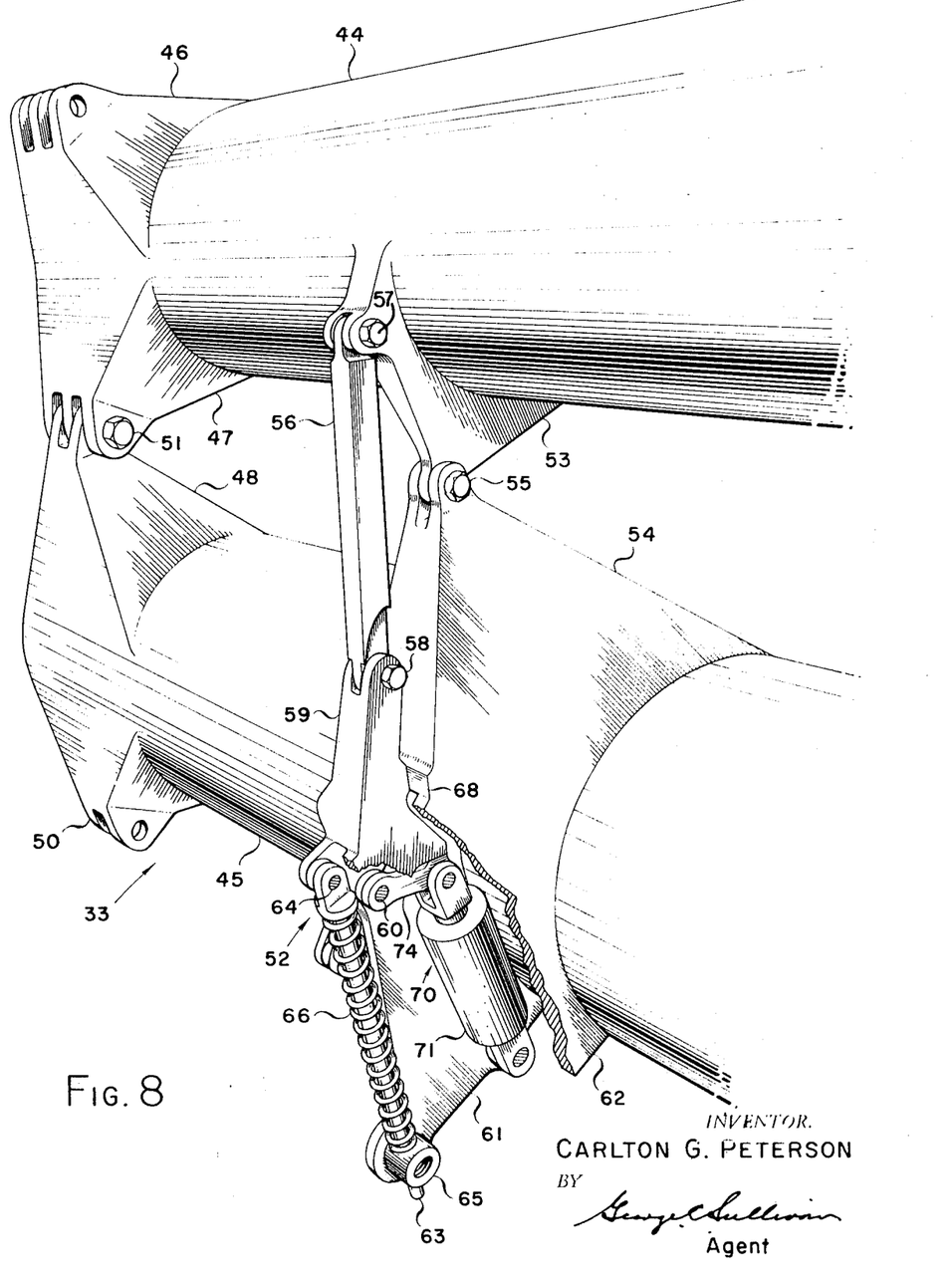
FIG. 8 is a perspective view of the foldable structural load bearing mechanism forming a part of the present invention.
Figure 9:
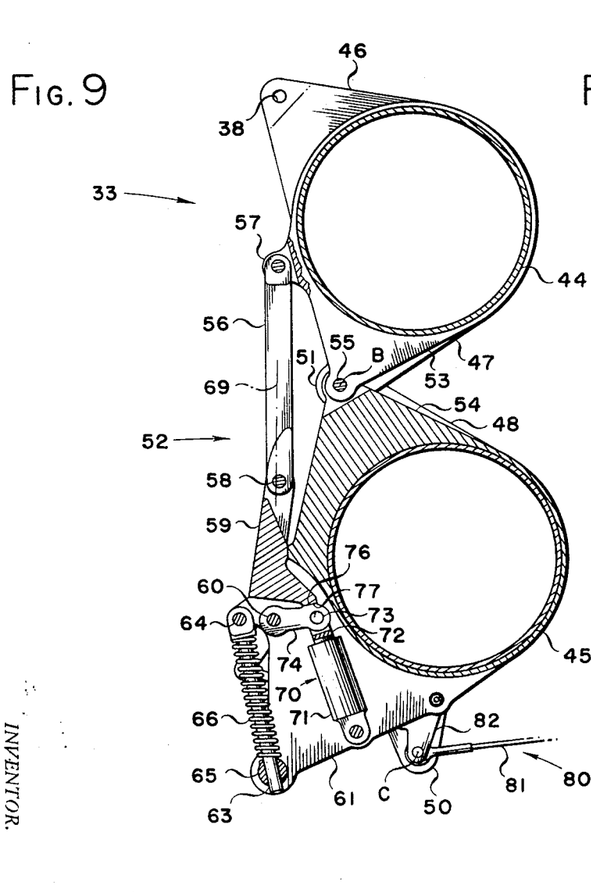
FIG. 9 is an enlarged view, partially in section, of the foldable mechanism showing interconnected torque tubes and over-center toggle linkage means therefor in a locked position.
Figure 10:
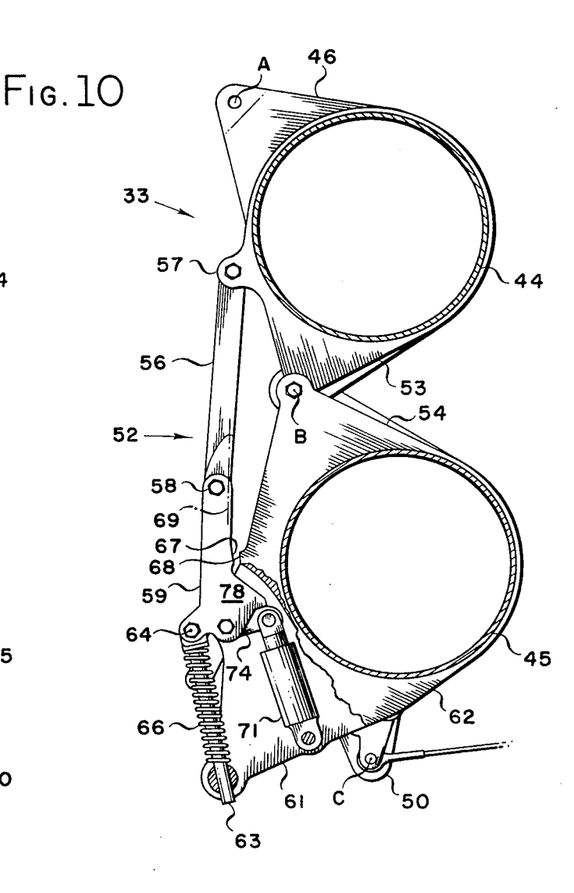
FIG. 10 is a view similar to that of FIG. 9, showing the toggle linkage means in an unlocked or open position.

One end of a jury strut 56 is pivotally connected as at 57 to bracket member 53, and its other end is pivotally connected as at 58 to an upper end of a jury strut 59, the lower end or base of which is pivotally connected to a pin 60 formed on one of two spaced webs or yoke plates 61, 62 integral with bracket member 54. A rod 63 is pivotally connected as at 64 to a heel formed on strut 59 and extends downwardly to a fixture 65 secured between webs 61, 62 and in which it is slidably mounted. A compression spring 66 is mounted about rod 63 and extends between fixture 65 and pivot connection 64, so as to load strut 59 in a direction urging a stop 67 mounted thereon against a mating stop 68 formed on bracket member 54 as shown in FIGS. 8, 9, 10. Thus, over-travel of toggle linkage 52 in one direction is terminated by abutment of stops 67, 68 with each other. Mechanism 33 is thus effectively locked to the right of a centerline 69 generated between pivot connection 57 and pin 60, and remains locked unless toggle linkage 52 is actuated to force pivot connection 58 for jury struts 56, 59 to the left of center line 69, as viewed in FIG. 10. Release of linkage 52 from its FIG. 9 position to an open or unlocked position as shown in FIG. 10 is achieved either automatically, i.e., by actuation of a hydraulic means 70 suitably disposed between webs 61, 62, or manually, i.e., by actuation of a cable means 80 illustrated in FIGS. 9 and 12.

Hydraulic actuator means 70 comprises a cylinder 71 and piston 72 therefor, actuable in conventional manner, cylinder 71 being pivoted to the face of web 61 while piston 72 is pivotally connected as at 73 to one end of a link 74 having its other end swingable about fixed pin 60 on web 61. A flat 76 (FIG. 9) is included on link 74 and which mates with a corresponding flat 77 on a foot 78 (FIG. 10) formed in depth of strut 59. Upon actuation of means 70, movement of the abutting engagement between flat 76 and flat 77 on foot 78 causes strut 59 to rotate about pivot connection 60, thereby forcing pivot connection 58 of toggle linkage 52 to cross to the left of center line 69 as viewed in FIG. 10.

Figure 12:
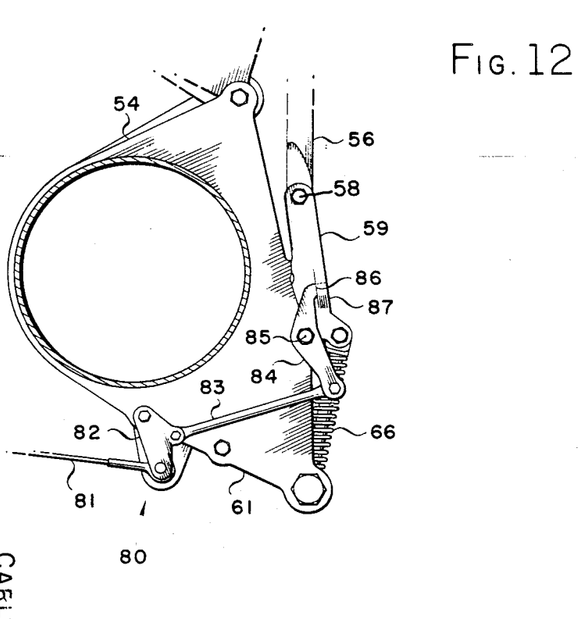
FIG. 12 is a view showing a manual release mechanism to unlock or open the toggle linkage means provided for the load bearing mechanism.

Cable means 80 is clearly illustrated in FIG. 12 which is a reverse view of a portion of FIG. 9. Such means comprises a cable 81, a link 82 to which cable 81 is pivotally connected at one of its ends, the opposite end of link 82 being pivotally mounted to web 61, a rod 83 having its one end secured to link 82 intermediate the latter's length, and a lever 84 pivotally mounted to bracket member 54 as at 85 and having its one end pivotally connected to the other end of rod 83. The other end of lever 84 includes a flat 86 engageable with an associated lug 87 projecting from a side of jury strut 59. Pulling of cable 81 rotates link 82, pulling rod 83 which in turn pivots lever 84, thereby causing flat 86 to push lug 87 and jury strut 59 in a direction forcing pivot connection 58 to cross center line 69.

It should now be apparent that hydraulic actuator means 70 and cable means 80 constitute independent means for releasing the over-center toggle linkage means 52 so that the torque tubes 44, 45 are free to fold from their unfolded positions or dead-center linkage arrangement.

Figure 13:
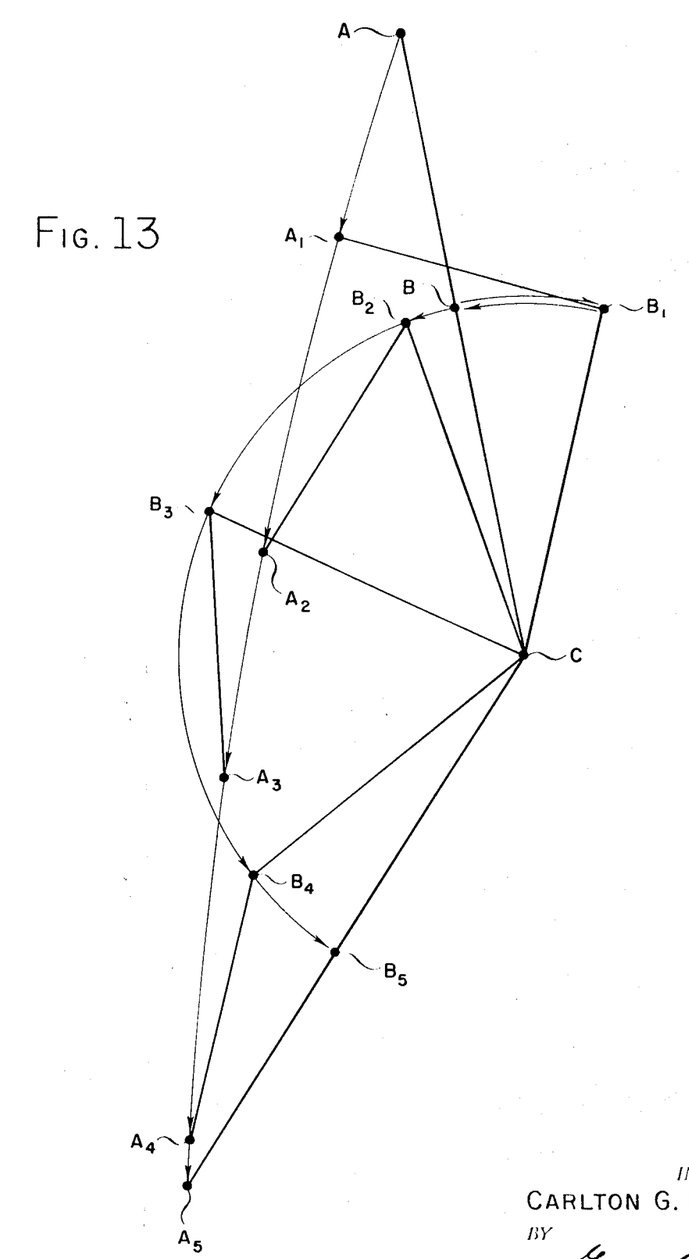
FIG. 13 is a kinematic diagram of stabilization links of such mechanism showing various locus points of the moving pivotal connections during actuation of the mechanism.

An explanation of the involved kinematics for a folding cycle of mechanism 33, taken in conjunction with FIG. 13, follows. This should assist in understanding that the linkage of elements falling along a straight line generated across axes A, B and C, in their respective positions for the extended or unfolded condition of mechanism 33 always breaks in one direction only from either of its positions corresponding to the up-and-down positions for nose 20. This linkage is known as a dead-center linkage, as shown in FIG. 10.

As a force is applied through actuation of hydraulic actuator means 70, strut 59 is kicked outwardly by flat 76 on link 74 engaging flat 77 thereon. A vertical load is established at pivot connection 60 mounted on web 61, as a result of distance between points 57 and 60 being decreased when struts or links 56 and 59 depart from center line 69. This force produces a moment for tube or free body 45 about axis C (vertecees 42), causing it to rotate in a clockwise direction as seen in FIG. 9. This rotation breaks the dead center linkage developed at the line generated through axes A, B and C, such dead-center linkage including torque tubes 44, 45. The force at pin 60 has an equal and opposite force at pivot connection 57, creating a moment on tube 44 about axis A opposing the moment applied to tube 45. However, the moment arm about axis A is less than that at axis C, with the net result that tube 45 moves in a clockwise rotation, forcing tube 44 to move in a counter-clockwise rotation about axis A even though the force at pivot connection 57 causes an opposite moment.

Axis B (pivot connection 55, FIG. 8) is caused to rotate about axis C clockwise to point $B_1$, axis C being essentially a fixed point on fuselage 17. Such rotation is kinematically shown in FIG. 13. Thereafter, axis A (in effect, nose 20) is free to move downward ahead of axis B in a radius about the hinge axis at 22 for a total travel across points $A-A_1-A_2-A_3-A_4-A_5$. As this occurs, axis B moves first in a clockwise arc and then follows axis A downward in a counter-clockwise radius about an arc a distance across points $B_1-B_2-B_3-B_4-B_5$, such points corresponding to the same points for axis A and characterized by like sub-scripts. Thus, with the cooperative action of locking toggle linkage means 52, a long travel for axis A, and thus, nose 20, is controlled by a short linkage of elements between axes A and C because fixed vertices 42, lying in axis C is midway between A and $A_5$ and tubes 44 and 45 form a folded out or extended dead-center linkage along the line generated across axes A, B and C whey they are at both nose-up and nose-down positions.

Figure 11:
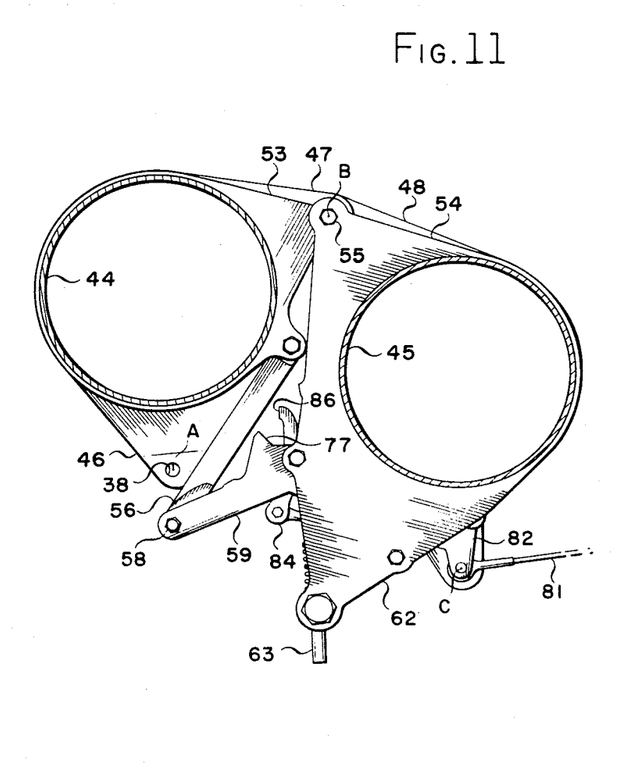
FIG. 11 is a view, partially in section, illustrating the position of torque tubes and toggle linkage means intermediate the folding cycle of the structural load bearing mechanism.

FIG. 11 is a view of torque tubes 44, 45 shown in their maximum folded positions relative to each other, where the distance of the line generated between axes A and C is a minimum, which is approximately midway between nose-up and nose-down positions. It is to be noted with respect to FIG. 10 that as axis A (connection at 38) commences to rotate about the nose hinge axis 22 during the initial breaking of toggle linkage 52 shown in FIG. 9, axis B (the line through pivot connections 51, 55) does not commence rotation about verteces 42 until after tube 44 is rotated to a position almost on the same horizontal plane as tube 45 and which position is shown in FIG. 11. As tube 44 so rotates, compression spring 66 which biases over-centered linkage 52 continues to be compressed against the slidable mounting for rod 63. In the position shown in FIG. 11, axis A has completed half of its revolution between nose full up and full down positions. Furthermore, it is noted axis B has not commenced substantial rotational movement. Consequently, it is noted that a short load path between the hard points corresponding to the dispositions of elements 38 and 42 is used in conjunction with a travel for element 38 almost twice the length of the load bearing mechanism.

The operation of the illustrated embodiment is initiated by simultaneous actuation of hydraulic cylinders assemblages 35 and 70 in a suitable conventional manner not forming a part of this invention. In lowering nose 20 from its position shown in FIG. 6 to its position shown in FIG. 7, strut 59 is initially kicked from its over-center position to dead-center and then over center line 69 away from the dead-center linkage comprising tubes 44, 45 along the line generated through axes A, B and C. Axis B initially remains along such line when strut 59 passes its dead-center position. Tube 45 then rotates clockwise because of the developed moment described above, breaking its dead-center linkage, and as hydraulic cylinder means 35 continues to extend, mechanism 33 folds to its maximum folded position shown in FIG. 11. Nose 20 continues to approach its position shown in FIG. 7, and as it does, toggle linkage 52 again crosses center line 69 to lock mechanism 33, and in effect, locking nose 20 for subsonic flight conditions.

To raise nose 20 from its position shown in FIG. 7 to its position shown in FIG. 6, for supersonic flight conditions, the same cycle is applied, the kinematic diagram of FIG. 13 being equally applicable to this folding cycle for mechanism 33 as it is in the reverse cycle immediately described above.

It should be understood that the principle and this described embodiment of the invention are not limited to the illustrated application for lowering and raising a nose on a supersonic aircraft. The invention is equally utilizable to other applications, examples of which are landing gears and flap mechanisms.

Pursuant to the requirements of the patent statutes, the principle of this invention has been explained and exemplified in a manner so that it can be readily practiced by those skilled in the art to which it pertains, such exemplification including what is presently considered to represent the best embodiment of the invention.

I claim:

1. A foldable structural load bearing mechanism comprising in combination, first and second torque tubes having their respective lengths in generally parallel alignment with each other, means pivotally connecting said tubes to each other so as to be foldable about their lengths with respect to each other, means mounted on each of said tubes for connecting said tubes to hard points on other structures, respectively, whereby structural loads between such structures are transmitted and absorbed through said mechanism in its folded and unfolded positions, said connecting means and pivotally connecting means lying in a line generated across said tubes in their unfolded positions, said tubes thereby constituting a dead-center linkage arrangement in such positions, and means for maintaining said foldable tubes in their dead-center linkage arrangement in their unfolded positions.

2. In combination with the said structural load bearing mechanism of claim 1, an actuating means mounted between the respective other structures for repositioning such structure during the folding of said tubes while said mechanism continues to transmit and absorb structural loads imposed on such structures, 3. The mechanism of claim 1 in which said maintaining means comprises an over-center toggle linkage means for locking said mechanism in an unfolded position.

4. The mechanism of claim 3 including means for releasing said over-center toggle linkage means whereby said tubes break and fold from their dead-center linkage arrangement.

5. The mechanism of claim 4 in which said releasing means comprises a cable means for forcing said over-center toggle linkage means across its center line thereby freeing said tubes for folding from their unfold positions.

6. The mechanism of claim 4 in which said releasing means comprises a link pivotally connected to bracket means formed on and associated with said second torque tube, a lever pivotally connected to said bracket means and having one end engaging said second jury strut, a rod connecting said lever to said link, and a cable connected to said link, whereby pulling of said cable pivots said link, said rod moving therewith to rotate said one end of said lever thereby swinging out said second jury strut from its over-center position to free said tubes for folding from their unfolded position.

7. The mechanism of claim 4 in which said releasing means comprises an actuating hydraulic means.

8. The mechanism of claim 7 in which said actuating hydraulic means comprises a hydraulic cylinder and piston assemblage pivotally mounted on bracket means formed on and associated with said second torque tube, a flat mounted on said second jury strut, a link pivotally connected to said bracket means, a mating flat on said link engaging said flat, said assemblage connected to said link at said mating flat, whereby actuating of said assemblage rotates said link about its pivotal connection, the engagement of said flat and mating flat rotating said second jury flat about its pivotal connection to said bracket means, said toggle linkage means thereby swinging out from its over-center position to free said tubes for folding from their unfolded position.

9. The mechanism of claim 3 in which said over-center toggle linkage means comprises first and second struts pivotally connected together with each of such struts being pivotally connected at its opposite end to a bracket means on its associated torque tube, and means for biasing said toggle linkage means in its over-center position corresponding to the dead-center linkage arrangement for said structural load bearing mechanism.

10. The mechanism of claim 9 including means for releasing said over-center toggle linkage means whereby said tubes break and fold from their dead-center linkage arrangement.

11. The combination of claim 6 in which said biasing means comprises a rod having one end pivotally connected to said second jury strut, a fixture securely connected to said second torque tube, said rod slidably mounted in said fixture, and a compression spring mounted about said rod between said fixture and the pivot connection of said rod to said second jury strut, said spring urging said second jury strut into said over-center position.

* * * * *

UNITED STATES PATENT OFFICE
CERTIFICATE OF CORRECTION

Patent No. 3,654,811　　　　　　　　Dated Apr. 11, 1972

Inventor(s) Carlton G. Peterson

It is certified that error appears in the above-identified patent and that said Letters Patent are hereby corrected as shown below:

Column 8, line 38, the comma "," should be read as a ---.--- (period). Column 10, Claim 11, the claim reference numeral "6" should read --9--.

Signed and sealed this 8th day of August 1972.

(SEAL)
Attest:

EDWARD M. FLETCHER, JR.　　　　ROBERT GOTTSCHALK
Attesting Officer　　　　　　　　Commissioner of Patents